United States Patent [19]
Holliday

[11] 3,718,390
[45] Feb. 27, 1973

[54] MICROFICHE INDEXER

[75] Inventor: Robert G. Holliday, Ann Arbor, Mich.

[73] Assignee: Xerox Corporation, Rochester, N.Y.

[22] Filed: June 19, 1970

[21] Appl. No.: 47,848

[52] U.S. Cl. .................................................353/27
[51] Int. Cl. ............................................G03b 23/08
[58] Field of Search..................................353/25, 27

[56] References Cited

UNITED STATES PATENTS 3,566,524   3/1971   Irasek...................................353/27
3,352,201   11/1967  Brownscombe......................353/27
3,183,771   5/1965   Rutkus..................................353/27
2,767,610   10/1956  Hintz et al...........................353/27

*Primary Examiner*—Leonard Forman
*Assistant Examiner*—Steven L. Stephan
*Attorney*—James J. Ralabate, Ronald Zibelli and Clarence A. Green

[57]  ABSTRACT

A microfiche containing a plurality of microimages is positioned relative to the imaging station of a microimage display device by a pivoted member journaled for rotation and a sliding traversing member.

12 Claims, 7 Drawing Figures

MICROFICHE INDEXER

BACKGROUND OF THE INVENTION

This invention relates to microfilms and in particular to methods and apparatus for positioning microfiche relative to image projection apparatus.

A microfiche is a single sheet of film containing a plurality of microimages normally arranged in rows and columns. Commonly, the microfiche includes areas for titles, authors, names, classification data, coordinates, etc. which can be read by the unaided eye. The microfiche is ideal for containing related images such as the pages of a report or book since it can easily and economically include from 20 to 112 and much greater microimages. Of course, the limiting number of microimages on any given microfiche depends on the dimensions of the microfiche and the microimages which is dictated by the needs of particular users.

The microimages of a microfiche are displayed by moving a desired microimage into the optical path of a projection system. Since the microimages are images that have been reduced in size to facilitate their storage, the projection system includes appropriate optical apparatus to blow the microimages back to their original or other suitable size. Prior known apparatus for positioning a microfiche so as to locate the different microimages adjacent the projection systems have generally included equipment designed to travel in a plane along orthogonal coordinates. That is, the microfiche is normally placed in a holder which in turn is coupled to a first track or gear mechanism that propels the holder north and south, for example, and these mechanisms are in turn supported on second tracks or gears that propel both the holder and the first mechanism east and west. Such apparatus is adequate but because of its complexity significantly increases the cost of a microfiche display system. As equally limiting is the fact that these rectangular indexing mechanisms occupy significant space since room must be set aside to move the microfiche over an area substantially equal to four times its own area in order to display the microimages at the four corners of a microfiche.

Accordingly, it is an object of the present invention to overcome the above difficulties of microfiche indexing apparatus.

Yet another object of this invention is to take advantage of the inherent flexible nature of most microfiche materials permitting a microfiche to be bent at least into a gentle arc. The bending or deforming of the microfiche permits it to be moved over generally a cylindrical path thereby reducing the plane area over which a microfiche travels for displaying the microimages at the corners.

Still another object of the invention is to devise simple methods and apparatus for moving a microfiche relative to a projection system.

These and other objects of the instant invention are realized by using a pivoted member to move a microfiche relative to one of the axes of the coordinate system in which the microimages are arranged. A traversing member is in turn carried by the pivoted member to move the microfiche relative to another axis of the coordinate system. The pivoted member effectively converts the rectangular coordinate system of a microfiche into a cylindrical coordinate system thereby yielding a saving in space. Just as important, however, is that the pivoted member significantly reduces the complexity of microfiche indexing apparatus.

DESCRIPTION OF THE INVENTION

The foregoing objects and other objects and features of the present invention will be apparent from a further reading of the present disclosure and from the drawings which are:

DESCRIPTION OF THE INVENTION

Microfiche are commonly made from rectangular shaped film including a photosensitive material such as silver halide coated over a transparent, flexible substrate such as a plastic sheet sold under the trademark "Mylar" or other suitable materials known in the microfilming arts. For the purposes of the present description the term "microfiche" is intended to not only include transparent images but also opaque images. An example of an opaque microfiche is a xerographic toner microimage fixed to an opaque flexible, reflective material such as ordinary bond paper. The following description speaks only of positioning a transparent microfiche relative to image projection apparatus but it is understood that the disclosed methods and apparatus are equally applicable to positioning an opaque microfiche relative to appropriate image display apparatus.

Figure 5:
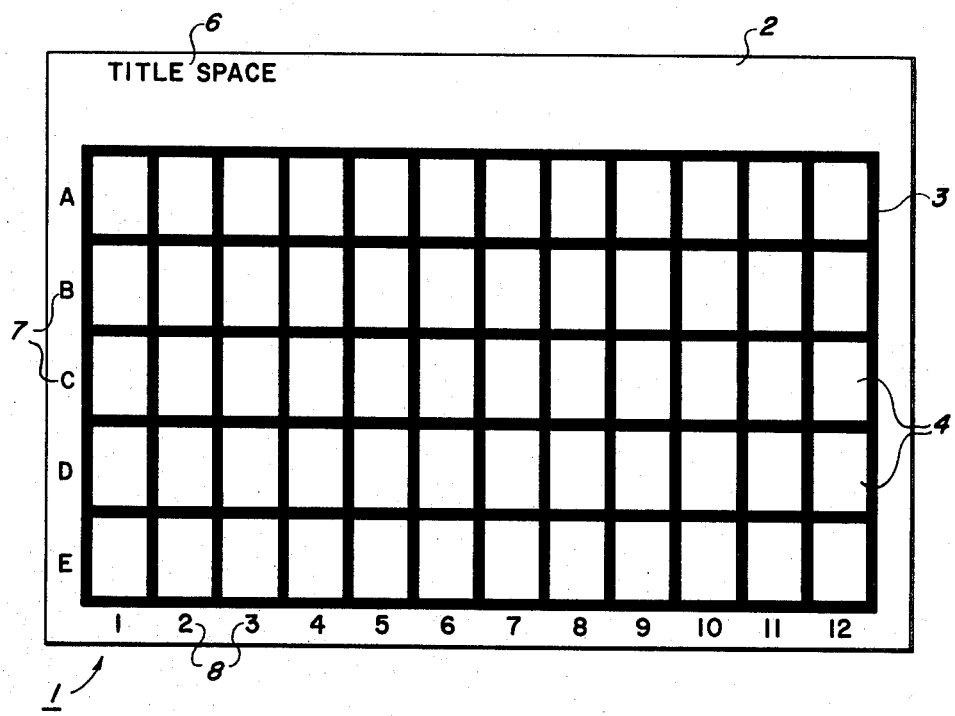
FIG. 5 is a plan view of a typical microfiche having a plurality of microimages laid out in a rectangular coordinate system.

FIG. 5 illustrates a typical transparent microfiche 1 composed of a flexible, transparent substrate 2 coated with an opaque material 3. The plurality of microimages 4 are formed by selectively removing the opaque material 3 in areas in which light is to be transmitted when the microimage is flooded with light. The opaque material between images forms a border that readily sets each microimage apart from its neighbor. Whether or not the microimages are readable by the unaided eye, the microfiche commonly includes readable information 6 that identifies the contents of the microfiche. The microimages 4 are arranged in a rectangular coordinate system of rows 7 and columns 8 identified by alphabetic and numeric characters. Other coordinate systems may be used to arrange the microimages such as one wherein the rows and columns are not at right angles. A circular coordinate system may be appropriate for certain applications. Nonetheless, the methods and apparatus of this invention are compatible with such diverse coordinate systems.

The term "flexible" describing the microfiche is intended to encompass the generally understood characteristics of plastic sheets. Those characteristics broadly include the ability to be bent into a curve or cylinder and return to an initial plane shape without cracking or otherwise substantially damaging the microfiche or the microimages on it.

Figure 1:
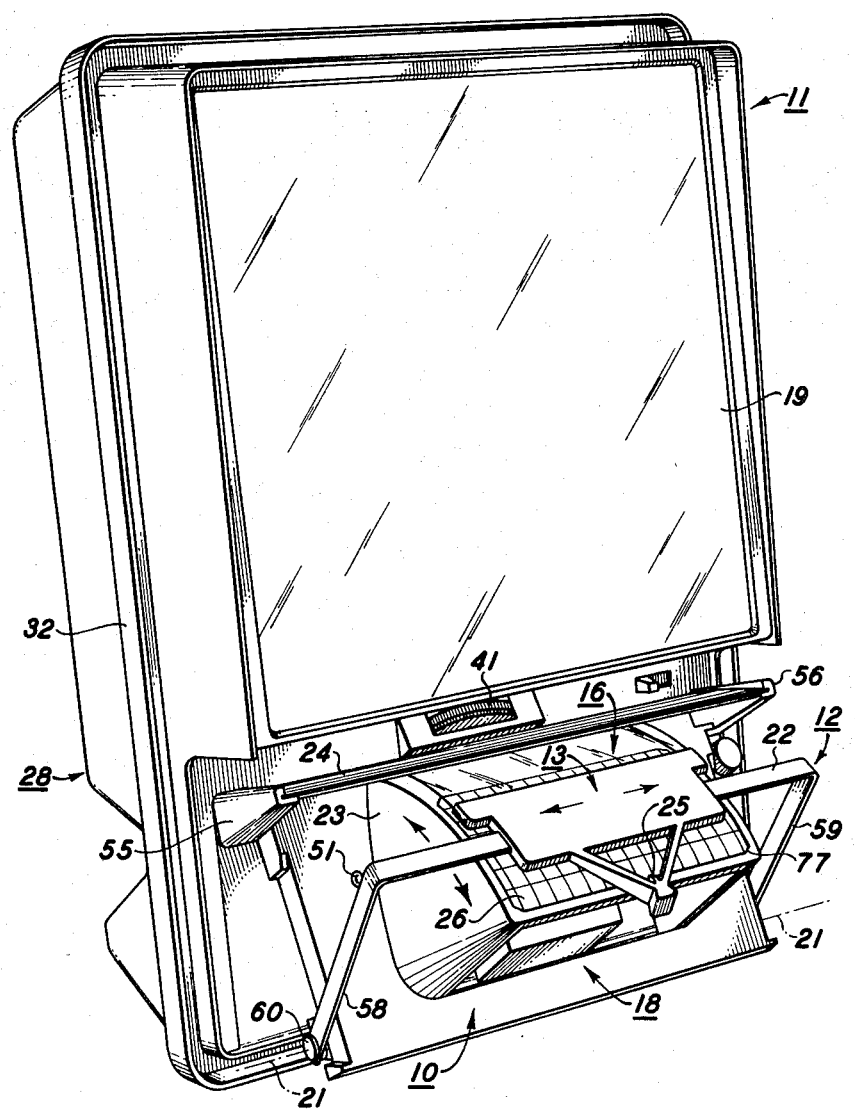
FIG. 1 is a perspective view of a microimage display devise suited for displaying microimages on roll film and/or microfiche film with a microfiche indexer according to the instant invention coupled to the display device.
Figure 2:
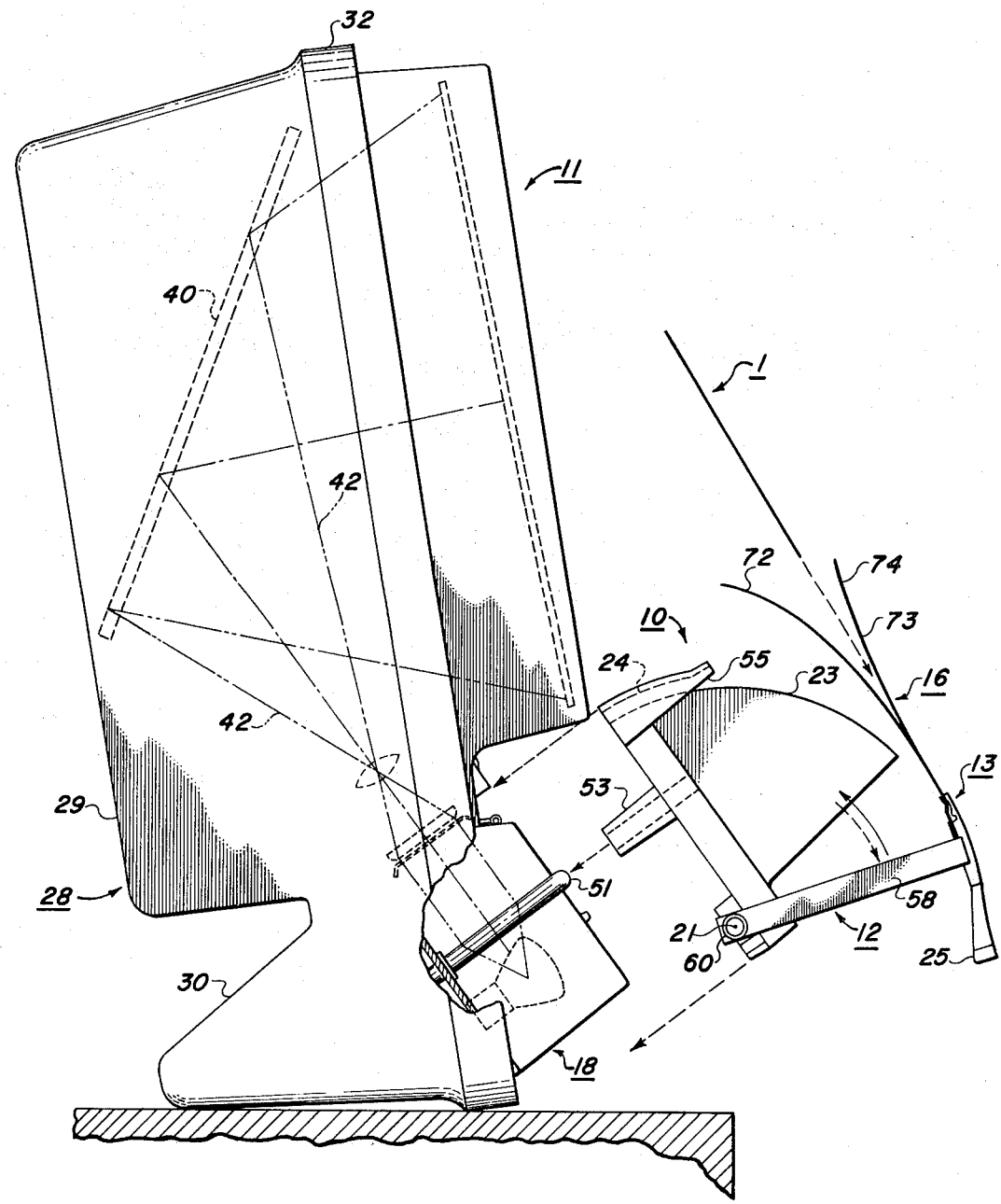
FIG. 2 is a side elevation view of the display device and microfiche indexer shown in FIG. 1 with the indexer at an exploded position.
Figure 3:
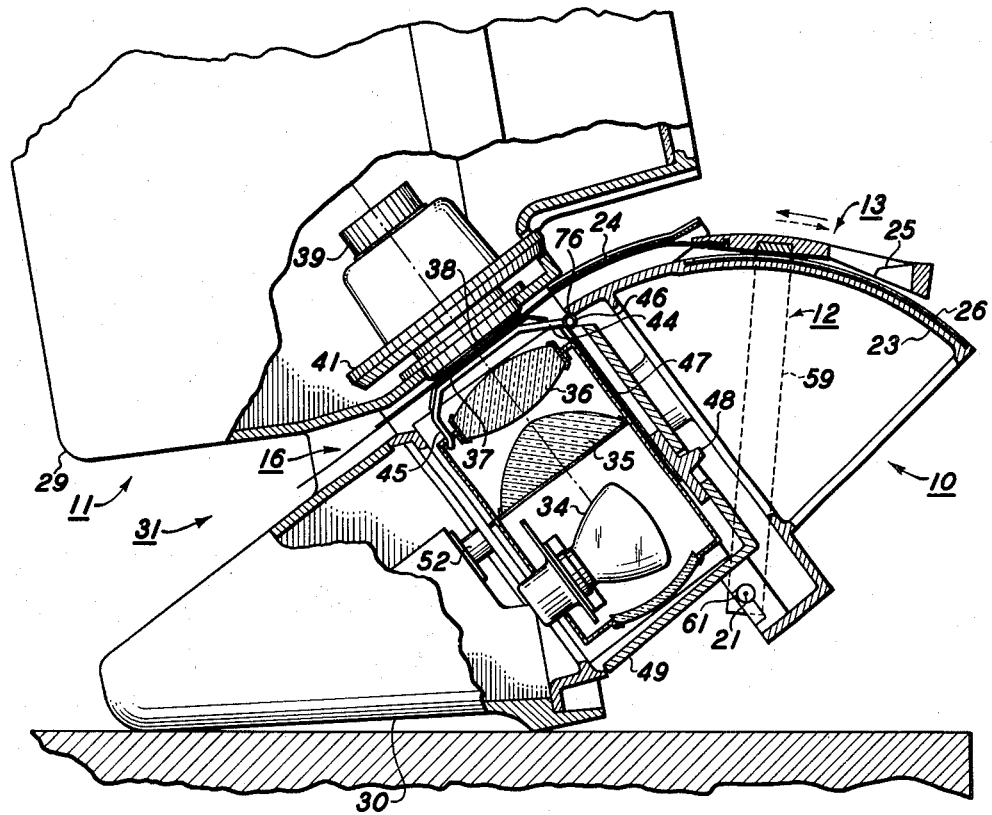
FIG. 3 is a isolated side elevation view of the projection apparatus of the display device and the indexer shown in FIG. 2.

A microfiche indexer 10 according to the present invention is shown with a microfilm viewer 11 in FIGS. 1, 2, and 3. The indexer includes the pivot member 12, the traverse member 13, and base 14. The traverse member also includes a transparent envelope 16 in which a microfiche 17 is carried. The viewer includes projection apparatus 18 and the translucent screen 19. The microfiche is moved relative to the projector by rotating the pivot member about its axis of rotation 21 and by sliding the transverse member back and forth along the slide portion 22 of the pivot member. The base includes a cylinder section 23 and a roof member 24 which together define a tunnel for guiding the envelope and microfiche over the projection apparatus. The transverse member includes a pointer 25 that is used in conjunction with a grid 26 to identify the particular microimage adjacent the projection apparatus. The grid is a card having the coordinate system of the microfiche printed on it and may also serve as a storage folder for the microfiche. The pointer is located relative to a microfiche in the envelope such that it is opposite the row and column on the grid corresponding to the location of the microimage opposite the projection apparatus.

The viewer 11 (microfiche display device) includes the housing 28 which is substantially a rectangular shaped, hollow box having an upper display section 29 and a lower projection section 30 (FIG. 2.) The two sections are separated by an aperture 31 of finite length, width and depth through which a microfiche 17 passes when being positioned over the projection apparatus 18. A bumper 32 extends completely around the periphery of the housing thereby allowing the viewer to be set on any side for display purposes. Consequently the up-down terminology used herein is intended to describe the specific orientation shown in the drawings and not to limit the invention in any manner.

The projection section of the viewer includes the tungsten lamp 34, condensing lenses 35 and lens barrel 39. The display section includes the plane mirror 40 and translucent screen 19. A microimage, on roll film or a microfiche, located at the imaging station defined by the space between the pressure plate and pad is illuminated by the lamp and lenses 35 and 36 and enlarged and projected onto the mirror and screen by appropriate lenses in the lens barrel. The lens barrel includes an adjustment knob 41 which is accessible from the front of the viewer for adjusting the focus of the display image.

The pressure plate and pad position all microimages at substantially the same point in the optical path defined generally by the lines 42 (FIG. 2) that represent rays originating at the lamp and terminating at the screen. The pressure plate 38 is a transparent plate (glass) opposite one end of the lens barrel. The pressure pad is also a transparent plate (glass) and is biased by the tension spring 44 upward against the pressure plate. (FIG. 3) The spring is held rigid at end 45 but is free to move downward at end 46 which is coupled to rod 47 and handle 48 for that purpose. The handle is slidably mounted in the frame 49 of the projection housing and pulls end 46 of the spring downward when depressed. This of course pulls the pressure pad from the pressure plate thereby enabling a roll microfilm or a microfiche to be fed into the bite of the pressure plate and pad. The force of the spring is sufficient to hold a microfiche or microfilm roll snugly against the pressure plate but not so tightly as to prevent either from being slid between them.

Viewer 11 is designed to handle rolls of microfilm wound on reels. A feed reel containing a roll of microfilm is inserted on spindle 52 and the film is threaded through the image station (i.e. between the pressure pad 37 and pressure plate 38) to a take up reel on spindle 52. The microimages on the film are displayed by winding and unwinding the film between the two spindles. (For clarity of illustration, the roll film and reels are not shown.)

The indexer 10 attaches to the viewer 11 by removing any of the above mentioned reels that may be on the spindles and by sliding the indexer onto the spindles. The indexer includes right and left spacer-sockets 53 that mate with the spindles 51 and 52. (Only the right socket is shown to more clearly illustrate the device.) The spacer-socket extends from the indexer base 14 as shown in FIG. 2 and abuts, along with the corner posts 55 and 56, against the viewer housing to maintain the indexer in alignment with the viewer imaging station.

The roof 24 is a thin metal sheet supported between the corner posts 55 and 56 (as best seen in FIG. 1) and is curved in an arc generally concentric with the arc of the cylindrical portion 23 of the base. (FIG. 3) The roof extends generally the width of the indexer and is sufficiently long to allow the left most and right most microimages on a microfiche to be placed at the imaging station (the position between the pressure plate and pad 37 and 38). The cylinder portion of the base has substantially a quarter circle cross-section that is generally concentric with the arc inscribed by the motion of the arm portions 58 and 59 of the pivot member.

Figure 4:
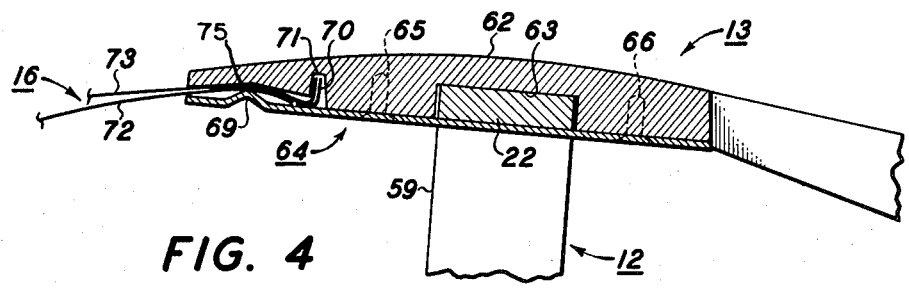
FIG. 4 is an enlarged sectional view of the traversing member of an indexer illustrating the manner in which it couples to a microfiche holder.

The pivot member 12 is a u-shaped metal bar that includes the horizontal slide portion 22 and two arm portions 58 and 59. The arms are journaled for rotation by means including the pins 60 and 61 coupled to the bottom of the base 14. The length of a pivot arm is selected to facilitate the movement of a microfiche past the imaging station. The traverse member 13 is slidably mounted on the slide portion of the pivot member as illustrated in FIG. 4. The body 62 of the traverse member includes a recess or cut out 62 that mates with the slide portion of the pivot member. The tension plate 63 is rigidly coupled to the body on either side of the recess and slidably secures the traverse member to the pivot member by appropriate fasteners 65 and 66. The irregularly shaped end 69 of the tension plate is effectively a bias member for coupling a microfiche or envelope to the body 62. The particular envelope 16 shown in the drawings includes a tail 70 that fits into the recess or cut-out 71 to help lock it to the body. The force exerted by the end 69 of the tension plate against the body is sufficient to hold an envelope or a microfiche without a tail member 70. The tail helps in aligning the envelope to the body.

Figure 6:
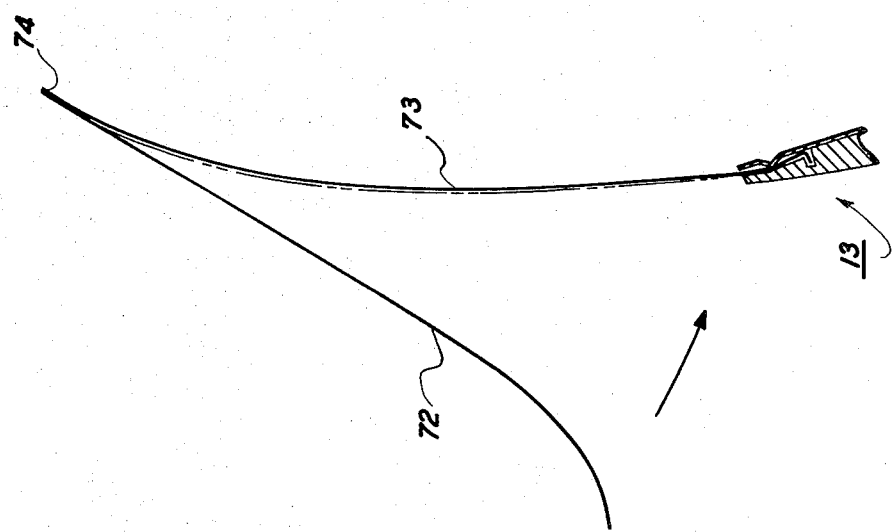
FIG. 6 is a side elevation view of another envelope coupled with a microfiche holder.

Envelope 16 is made from transparent plastic such as that sold under the trademark "Mylar" or other commercially available transparent plastic. The envelope is "flexible" in the same sense as the microfiche and includes lower and upper flaps 72 and 73 seen in FIGS. 1 and 2. A microfiche 17 fits into the envelope between the two flaps. The upper flap is shorter than the lower to facilitate the insertion and withdrawal of a microfiche. The bottom edge of a microfiche is aligned to guide marks (not shown) on the envelope. An example of another envelope configuration is one in which an upper flap is hinged at the loose end 74 of a lower flap rather than at the anchored end 75 as with envelope 16 as shown in FIG. 6. The envelope is convenient means for coupling a microfiche to the indexer and also acts to protect the microfiche from being scratched or otherwise defaced when moved between the pressure pad and plate 37 and 38. Since the envelope is flexible it is easily placed in the withdrawn position shown in FIG. 2 for inserting and withdrawing a microfiche.

Referring now to FIG. 3, once a microfiche is loaded into the envelope as illustrated in FIG. 4, the envelope is fed into the tunnel defined by the roof 24 and cylinder 23. The tunnel guides the envelope into the bite between the pressure plate 38 and pressure pad 37. The pressure pad is moved downward by the cam surface 76 on the base when the indexer is mounted on the spindles 51 and 52. The envelope and microfiche are bent into an arc by the tunnel and their tendency to return to their initial plane configurations acts as a bias to urge both firmly upward against the pressure plate into an appropriate position in the optical path of viewer 11. The aperture 31 in the viewer housing permits the envelope and microfiche to be moved relative to the lens barrel 39.

The envelope and microfiche are moved generally right and left relative to the imaging station (defined broadly by the pressure plate and pad 38 and 37) by rotating the pivot member 12 clockwise and counterclockwise. The envelope and microfiche are moved generally in and out of the plane of the drawing by sliding the traverse member along the slide portion 22 of the pivot member. The microimage under the lens barrel 39, i.e. at the imaging station, is identified by the pointer 25 and grid 26 (FIG. 1). The grid is a paper card having the format of the microfiche coordinate system printed on it. It is attached to the cylinder portion 23 of the indexer by merely inserting its edges into four corner slots 77. When microfiche having different coordinates are in use a corresponding grid is coupled to the indexer. The pointer 25 is spaced from the envelope 16 so that it is located opposite the row and column on the grid that identifies the location of the microimage being displayed. The pointer is also a convenient handle for rotating the pivot member and sliding the traverse member when positioning different microimages at the imaging station.

The rotating motion of the pivot member effectively converts the rectangular coordinates of a microfiche into cylindrical coordinates at least as far as the apparatus is concerned. The axes of a cylindrical coordinate system are the angle $\theta$ between a radius and a reference line and the distance $z$ between the plane defined by the radius and reference line and a parallel reference plane. In the case of indexer 10, the angular position of the pivot member is the $\theta$ coordinate and the position of the traverse member on the slide portion of the pivot member is the $z$ coordinate. In the present embodiment, the microfiche can be thought of as moving past the imaging station in a plane tangent to the circle inscribed by the pivot member. Nonetheless, a portion of the microfiche moves over a cylindrical surface while being repositioned in the aforementioned tangent plane. This of course illustrates another significant feature of this invention which is that the microimage being projected onto the display screen is in a plane configuration. If the projected microimage is curved or otherwise significantly deformed from a plane configuration the image displayed by the viewer may be distorted.

Figure 7:
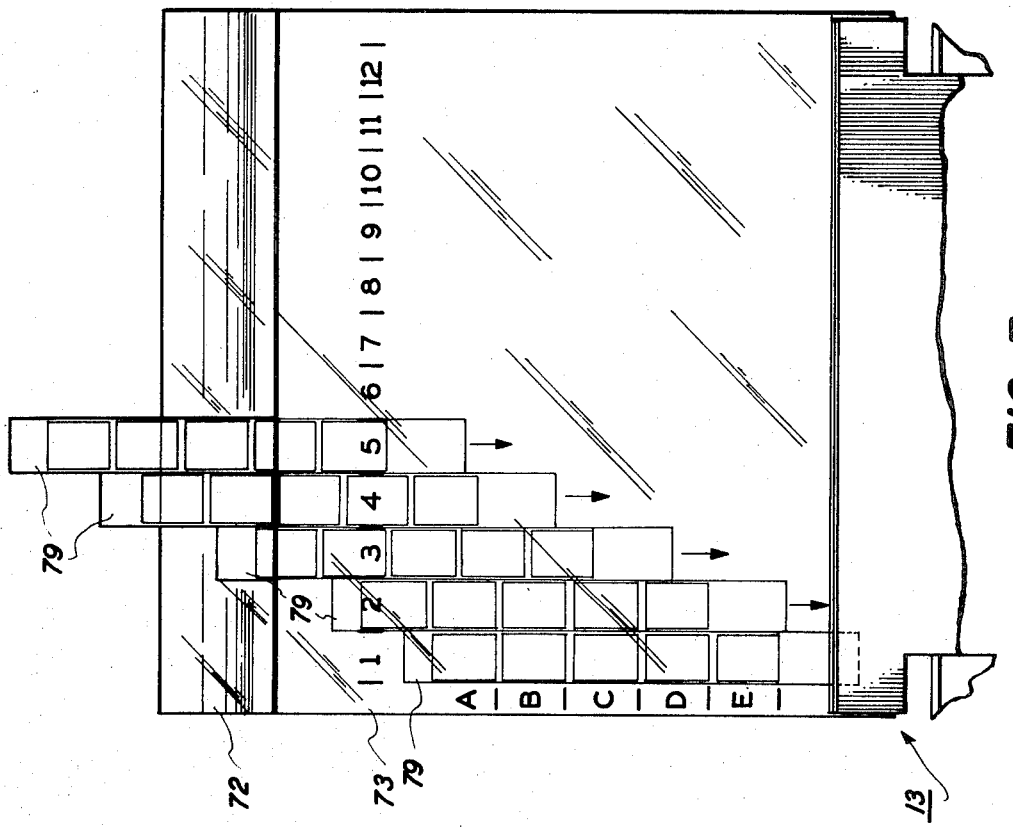
FIG. 7 is plan view of a plurality of microfilm strips being inserted into the envelope and microfiche holder.

Several changes and modifications can be made to the above described indexer without departing from the spirit of the present invention. For example, a microfiche can be coupled to the indexer without the use of an envelope. Also, the microfiche may be a single short strip of microfilm or a plurality of microfilm strips 79 anchored at one end to the slide and arranged in parallel to create a two dimensional array of microimages as shown in FIG. 7. These strips can be formed merely by cutting off sections of a regular microfilm roll. It is particularly noted that the present method and apparatus for positioning a microfiche is described in connection with specific display apparatus, i.e. viewer 11. Other display apparatus will suggest modifications that are appropriate for the adaption of this invention. Consequently, the present description is intended to be illustrative of the invention and limiting.

What is claimed is:

1. An assessory to permit a viewer designed for reel film to be converted to a microfiche viewer, and back again, said viewer including a projection apparatus having predetermined optical axis; spindles removably supporting supply and take-up reels for said film on either side of said viewer optical axis whereby said film may be advanced across said optical axis for viewing thereof, the combination comprising a. a base member having spacer sockets for receiving said spindles whereby to enable said base to be mounted in operative position on said viewer in place of said film reels, said base member having a cylinder portion adapted to support a grid system in operative relationship to said optical axis;

b. a pivot member rotatably mounted on said base member for accurate movement over said cylinder portion of said base member about a predetermined axis substantially concentric with said cylinder portion, said pivot axis laying within the confines of said base member and, c. a traverse means slidably mounted on said pivot member and having a gripping means such that a microfiche held by such gripping means may be drawn across said optical axis for viewing thereof in a direction substantially traverse to said arcuate movement along a line parallel to but spaced apart from said pivot member axis, said traverse means being movable independently of the movement of said pivot member and said traverse means including a pointer disposed in operative relation to said grid whereby to enable the selective positioning of an image on said microfiche in said optical axis.

2. The accessory of claim 1 wherein said base includes a cylinder portion which along with said roof member defines a tunnel through which a microfiche is guided into and out of the imaging station.

3. The accessory of claim 2 wherein said cylinder portion includes means for coupling to said grid having the coordinates of said microfiche thereon and wherein said traverse member includes a pointer member supported relative to said grid on said cylinder to identify the microimage on a microfiche at said optical axis.

4. The accessory of claim 1 including means for coupling to said indexer a plurality of microfiche in the form of microfilm strips.

5. The accessory of claim 1 further including means to identify the microimage on a microfiche adjacent the imaging station.

6. The accessory of claim 1 further including an envelope coupled to said transverse member for carrying and protecting a microfiche.

7. The accessory of claim 6 wherein said envelope includes upper and lower flaps of different lengths coupled at the same end to the transverse member.

8. The accessory of claim 6 wherein said envelope includes upper and lower flaps, one flap being anchored at one end to the traverse member leaving one end thereof free and the other flap being hinged to the free end of the anchored flap.

9. The accessory of claim 1 wherein said pivot member includes an arm portion journaled in the base and a slide portion extending generally perpendicular to the path traveled by the pivot member.

10. The accessory of claim 9 wherein said traverse member is coupled to the slide portion of the pivot member for sliding movement thereon.

11. An assessory to permit a viewer designed for reel film to be converted to a microfiche viewer, and back again, said viewer including a projection apparatus having a predetermined optical axis; spindles removably supporting supply and take up reels for said film on either side of said viewer optical axis whereby said film may be advanced across said optical axis for viewing thereof, the combination comprising a. a base member having spacer sockets for receiving said spindles whereby to enable said base member to be mounted in operative position on said viewer in place of said film reels, said base member having a cylinder portion adapted to support a grid in operative relation to said optical axis;

b. a U-shaped pivot member rotatably mounted on said base member for arcuate movement over said cylinder portion of said base member about a predetermined axis substantially concentric with said cylinder portion, said pivot axis laying within the confines of said base member; and, c. A traverse means slidably mounted on the closed end of said pivot member so as to traverse across said grid and having a gripping means such that a microfiche held by said gripping means may be drawn across said optical axis for viewing thereof in a direction substantially traverse to said arcuate movement along a line parallel but spaced apart from said pivot member axis, said traverse means being movable independently of said pivot member movement, said gripping means comprising a transparent envelope for carrying and protecting said microfiche.

12. The accessory of claim 11 further including a roof member coupled to said base which together with said cylinder portion defines a tunnel through which a microfiche is guided into and out of said optical axis.

* * * * *